United States Patent
Conrad et al.

(10) Patent No.: US 8,468,714 B2
(45) Date of Patent: Jun. 25, 2013

(54) METHOD FOR THE SIMULTANEOUS STORAGE AND DRYING OF SEWAGE SLUDGE

(75) Inventors: Tilo Conrad, Nürtingen (DE); Steffen Ritterbusch, Stuttgart (DE); Markus Bux, Pliezhausen (DE)

(73) Assignee: TSP GmbH, Filderstadt-Bernhausen (DE)

( * ) Notice: Subject to any disclaimer, the term of this patent is extended or adjusted under 35 U.S.C. 154(b) by 0 days.

(21) Appl. No.: 13/381,721

(22) PCT Filed: Apr. 28, 2010

(86) PCT No.: PCT/EP2010/055747
§ 371 (c)(1),
(2), (4) Date: Mar. 21, 2012

(87) PCT Pub. No.: WO2011/000589
PCT Pub. Date: Jan. 6, 2011

(65) Prior Publication Data
US 2012/0168388 A1    Jul. 5, 2012

(30) Foreign Application Priority Data
Jul. 2, 2009 (DE) .......................... 10 2009 033 028

(51) Int. Cl.
*F26B 3/08*     (2006.01)
(52) U.S. Cl.
USPC .............. 34/363; 34/367; 34/370; 34/377; 34/397; 34/90; 162/41; 162/57; 210/170.08; 71/10; 44/497; 438/85; 118/696
(58) Field of Classification Search
USPC .............. 34/359, 363, 367, 370, 377, 380, 34/381, 397, 90; 162/41, 57, 90; 210/603, 210/170.01, 170.08; 71/10; 44/593, 497, 44/498, 605; 438/85, 86, 94; 118/696; 257/E31.029, E31.027
See application file for complete search history.

(56) References Cited

U.S. PATENT DOCUMENTS 4,344,847 A * 8/1982 Grenet ........................ 203/11
4,668,388 A    5/1987 Dibble
(Continued)

FOREIGN PATENT DOCUMENTS

DE     4315321 A1    11/1994
DE     19836268 A1 * 2/2000
(Continued)

OTHER PUBLICATIONS

English translation of the International Preliminary Report on Patentability issued in corresponding International Application Serial No. PCT/EP2010/05574T.

(Continued)

*Primary Examiner* — Stephen M. Gravini
(74) *Attorney, Agent, or Firm* — Fish & Richardson P.C.

(57) ABSTRACT

The invention relates to a method for the simultaneous storage and drying of sewage sludge, comprising the following steps: a) mechanically dewatering the sewage sludge down to a dry substance concentration of 10 to 35 percent; b) applying the dewatered sewage sludge to a floor of a greenhouse-type drying hall in which a transparent building envelope forms the roof over the floor; c) drying the sewage sludge using solar radiation that radiates into the drying hall; d) mechanically dewatering additional sewage sludge down to a dry substance concentration of 10 to 35 percent; e) introducing the dewatered additional sewage sludge into the drying hall and mixing the additional sewage sludge with the sewage sludge already in the drying hall; f) drying said mixture using solar radiation that radiates into the drying hall; and g) evacuating the mixture from the drying hall or repeating steps d) to f), wherein in step e), the additional sewage sludge is mixed with the mixture in the drying hall rather than with the sewage sludge in the drying hall.

17 Claims, 1 Drawing Sheet

U.S. PATENT DOCUMENTS

| | | | | |
|---|---|---|---|---|
| 4,962,034 | A | * | 10/1990 | Khan .............................. 435/262 |
| 5,194,147 | A | * | 3/1993 | Augustine et al. ............ 210/151 |
| 5,227,060 | A | * | 7/1993 | Roy et al. ...................... 210/258 |
| 5,277,814 | A | * | 1/1994 | Winter et al. ................. 210/604 |
| 5,355,594 | A | * | 10/1994 | Hwang .......................... 34/356 |
| 6,159,380 | A | * | 12/2000 | Russell et al. ................ 210/709 |
| 6,436,157 | B1 | * | 8/2002 | Winter et al. .................... 44/593 |
| 6,451,206 | B1 | * | 9/2002 | Charbonneau ........... 210/170.09 |
| 7,340,845 | B2 | * | 3/2008 | Kneebone ......................... 34/60 |
| 7,887,705 | B2 | * | 2/2011 | Honda et al. ................. 210/603 |
| 8,262,853 | B2 | * | 9/2012 | Holtzapple et al. ............. 162/41 |
| 2005/0241174 | A1 | * | 11/2005 | Kolega et al. ..................... 34/93 |
| 2009/0188127 | A1 | * | 7/2009 | Gorbell et al. ................. 34/388 |
| 2012/0168388 | A1 | * | 7/2012 | Conrad et al. ................ 210/771 |
| 2013/0005073 | A1 | * | 1/2013 | Wang .............................. 438/86 |

FOREIGN PATENT DOCUMENTS

| | | | |
|---|---|---|---|
| DE | 102007030927 A1 | | 1/2009 |
| DE | 102008039005 A1 | * | 2/2010 |
| FR | 2857086 A1 | | 1/2005 |
| JP | 2003104785 A | * | 4/2003 |
| WO | 03056263 A1 | | 7/2003 |
| WO | 2008052792 A2 | | 5/2008 |
| WO | WO 2008153267 A1 | * | 12/2008 |

OTHER PUBLICATIONS

International Search Report mailed Dec. 6, 2010, which issued in corresponding International Application No. PCT/EP2010/055747.

* cited by examiner

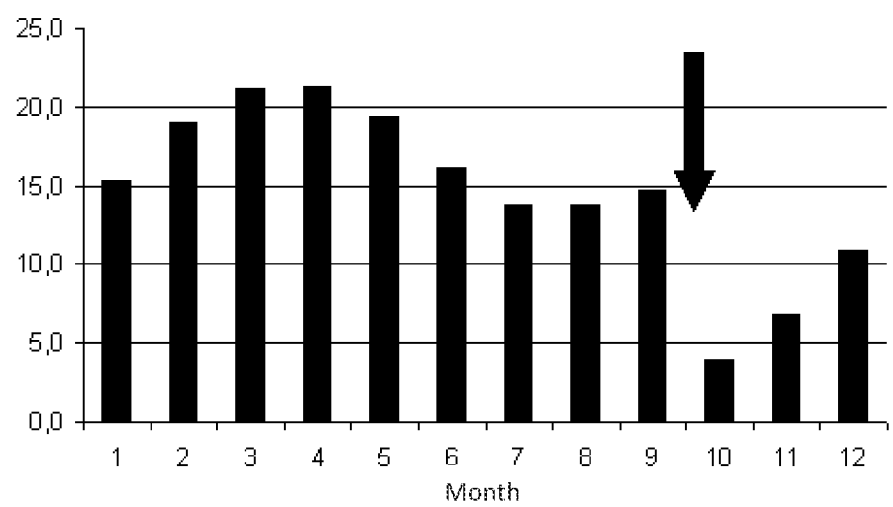

METHOD FOR THE SIMULTANEOUS STORAGE AND DRYING OF SEWAGE SLUDGE

CROSS REFERENCE TO PRIOR APPLICATIONS

This is a U.S. National Phase application under 35 U.S.C. §371 of International Patent Application No. PCT/EP2010/055747, filed Apr. 28, 2010, and claims the priority of German Patent Application No. 10 2009 033 028.3, filed Jul. 2, 2009 both of which are incorporated by reference herein in their entirety. The International Application published in German on Jan. 6, 2011 as WO 2011/000589 under PCT Article 21(2).

The invention relates to a method for the simultaneous storage and drying of sewage sludge.

The utilization of sewage sludge in the agriculture industry is becoming increasingly less acceptable in the eyes of the public, lawmakers and the food industry, due to the contaminants that sewage sludge contains. Drying the sewage sludge makes additional utilization options possible, such as independent incineration, for example.

From WO 03/056263 A1, a method is known in which sewage sludge is dried on a surface in a building utilizing the greenhouse effect. In this case, the sewage sludge is applied to the surface, removed from the apparatus after drying, and disposed of by incineration, for example. Another batch of sewage sludge, which has been collected in the meantime and stored intermediately, can then be distributed over the surface and dried. The sewage sludge can be intermediately stored in silos, for example. One disadvantage of this method is that it is relatively high-maintenance and therefore costly, particularly for small communities having populations of fewer than ten thousand.

The problem addressed by the present invention is that of providing an alternative drying method that can be implemented cost-effectively and is particularly suitable for small communities. Furthermore, a device that is suitable for implementing this method shall be provided.

This problem is solved by the features of claims 1 and 16. Expedient embodiments result from the features of claims 2 to 15.

According to the invention, a method for simultaneous storage and drying of sewage sludge is provided, comprising the following steps:
a) Mechanically dehydrating the sewage sludge to a dry mass content of 10% to 35%, especially 10% to 30%, preferably 10% to 25%, particularly preferably 15% to 20%,
b) Applying the dehydrated sewage sludge to the floor of a greenhouse-like drying hall, the floor of which is roofed by a transparent building shell,
c) Drying the sewage sludge utilizing solar radiation that radiates into the drying hall,
d) Mechanically dehydrating additional sewage sludge to a dry mass content of 10% to 35%, especially 10% to 30%, preferably 10% to 25%, particularly preferably 15% to 20%,
e) Introducing the dehydrated additional sewage sludge into the drying hall and mixing the additional sewage sludge with the sewage sludge that is already present in the drying hall,
f) Drying the resulting mixture utilizing solar radiation that radiates into the drying hall, and
g) Clearing the mixture out of the drying hall or repeating steps d) to f), wherein in step e) the additional sewage sludge is mixed with the mixture that is already present in the drying hall, rather than with the sewage sludge that is already present in the drying hall.

The particularity of the method according to the invention consists in that mechanically dehydrated sewage sludge is mixed, in a greenhouse-like drying hall, with dried sewage sludge that is already present there, and the resulting mixture is then dried. Once it has been dried, the mixture is then ready to be mixed with mechanically dehydrated additional sewage sludge.

"Drying" within the context of the invention is also understood to include partial drying. The sewage sludge that is already present in the drying hall according to step e) and the mixture that is already present in the drying hall according to step g) can therefore be present in fully or partially dried form.

The "sewage sludge" and the "additional sewage sludge" do not need to be different in terms of composition and origin. The different designations have been chosen merely to distinguish between the sewage sludge that is introduced first and sewage sludge that is introduced at a later time.

With the method according to the invention, the sewage sludge that is collected in the sewage treatment plant can be mechanically dehydrated directly as it is collected, i.e., without intermediate storage, and can then be dried in the drying hall. It is not necessary to provide facilities for intermediately storing the sewage sludge, more particularly, silos. Furthermore, with the in particular continuously occurring mechanical dehydration of the sewage sludge as it collects in the sewage treatment plant, the intermittent production of large quantities of filtrate water, such as would occur with the mechanical dehydration of the contents of a silo, for example, can be avoided.

Therefore, it is also unnecessary to provide buffer containers for receiving the filtrate water. Moreover, the system for mechanically dehydrating the sewage sludge can be relatively inexpensive and small in design, because it needs to dehydrate only a relatively small quantity of sewage sludge at a time.

The inventors have found that by mixing with the already pre-dried sewage sludge or the already pre-dried mixture, the development of unpleasant odors is avoided highly efficiently. The microorganisms present in the sewage sludge and in the additional, sewage sludge serve to restabilize the sewage sludge during drying. The microorganisms can be microorganisms from the aeration basin of a sewage treatment plant.

The inventors have further found that in carrying out the method according to the invention, in addition to being dried, the sewage sludge or the mixture is also made hygienic. The inventors presume that this is because the sewage sludge and the mixture remain in the drying hall for an extended period of time, and the day-night rhythm and the weather result in continuous temperature fluctuations. Solar radiation also presumably contributes to making the sludge hygienic.

The method according to the invention permits a largely continuous drying of the collected sewage sludge. The mixture can be cleared out of the drying hall only one time per year, for example. For this purpose, the introduction of additional sewage sludge can be interrupted for several days, for example, 20 days during the summer, until the mixture has reached the desired degree of dryness. Once the mixture has been cleared out of the drying hall, the hall is then ready for the method to be started again. The mixture can be cleared out of the drying hall using a wheel loader, for example. By clearing the mixture out of the drying hall only once yearly, the need to constantly keep an own wheel loader on site for clearing out the hall can be dispensed with. This also contributes to keeping the financial cost of carrying out the method low. This is particularly important for smaller communities. Moreover, drying by utilizing solar radiation that radiates into the drying hall is unaffected by fluctuations in energy prices, so that the costs of drying are kept consistently low over the long term.

The sewage sludge and/or the additional sewage sludge are preferably distributed after and/or during step b) and/or step e) onto the floor or onto the present sewage sludge or the present mixture. Distribution can be carried out, for example, by means of a conveyor apparatus arranged above the floor at a movable carrier. The conveyor apparatus can be a rolling conveyor, for example, extending transversely above the floor, such as is known from DE 43 15 321 A1, for example.

Alternatively, the conveyor apparatus can be disposed at the carrier so as to be movable, for example, by means of an overhead gantry crane. In this, the conveyor apparatus is configured such that it can be moved over every part of the floor. For this purpose, the carrier can extend once transversely across the entire floor of the drying hall and can be movable on tracks arranged on both sides along the floor. Further, a device can be provided at the carrier or the conveyor apparatus, by means of which the distance between the conveyor apparatus and the floor can be adjusted, particularly depending on the distance between the conveyor apparatus and the floor as determined by a sensor. A conveyor apparatus of this type is known from WO 03/056263 A1, for example.

By means of a conveyor apparatus of this type, sewage sludge or additional sewage sludge applied in only one location, for example, can be distributed over the entire floor or over the entire mixture. After drying, the conveyor apparatus can also be used to transport the mixture out of the drying hall or to pile it up in one area or one location on the floor. Furthermore, using a conveyor apparatus of this type, the method according to the invention can be carried out in an automated fashion.

The distribution, particularly the uniform distribution, on the floor or the mixture accelerates drying, and increases drying performance with a predefined floor area. However, if the sewage sludge or the additional sewage sludge has a very low viscosity, distribution is not necessary, particularly as part of or following step b) and/or e), and especially when applying or introducing onto multiple locations on the floor, because the sewage sludge or the additional sewage sludge will be automatically distributed across the floor or the mixture by flowing.

In a preferred embodiment of the method, the sewage sludge and the mixture are turned and thereby aerated during steps c) and f), preferably depending on weather conditions and/or the moisture content of the sewage sludge or the mixture, and particularly by means of a self-propelled turning device or by means of a/the conveyor apparatus arranged, preferably movably, above the floor at a/the movable carrier. The self-propelled turning device can be the "electric pig" distributed by the applicant, for example. By the aeration the growth of aerobic microorganisms, and thereby an aerobic restabilization of the sewage sludge is achieved.

In one embodiment of the method according to the invention, mixing according to step e) and/or g) is carried out by means of a/the self-propelled turning device or by means of a/the conveyor apparatus arranged, preferably movably, above the floor at a/the movable carrier. This allows further automation of the method.

Steps d) to f) can be repeated in step g) at least five times, particularly at least ten times, preferably at least 20 times, particularly preferably at least 40 times, before the mixture is cleared out of the drying hall. Before being cleared out according to step g), the mixture can be dried in step f) until it reaches a dry mass content of at least 70%, especially at least 85%, preferably at least 90%. Such a mixture, in contrast to moist sewage sludge, can be incinerated without heating using additional fuels, for example, in a power plant or a cement plant. It has a heating value that corresponds approximately to that of raw brown coal. Phosphate can be obtained from the ash of the mixture.

With particular preference, the mixture is cleared out only once per year. This allows short-term weather fluctuations to be largely compensated, so that in each case after one year, approximately the same dry mass content of the mixture can be expected. Moreover, if the mixture is cleared out only once yearly, the intermediate storage of wet sewage sludge is unnecessary and, if the mixture is not cleared out automatically, the need to constantly keep a suitable device, for example, a wheel loader, on site, is dispensed with. A device of this type can be rented for the short term for clearing the mixture out, thereby further reducing the cost of the process.

At least one opening is preferably present in the floor, through which the sewage sludge is applied according to step b) and the additional sewage sludge is introduced according to step e). For this purpose, the sewage sludge, after mechanical dehydration, can be forced through the opening by at least one pump. The sewage sludge can thereby be distributed onto the floor and/or the additional sewage sludge can be distributed onto the present sewage sludge or the present mixture, particularly if multiple openings are present and/or if the sewage sludge or the additional sewage sludge has a rather low viscosity.

Alternatively or additionally, the application of the sewage sludge according to step b) and the introduction of the additional sewage sludge according to step e) can also be carried out from above. For this purpose, a belt conveyor or screw conveyor arranged above the floor, or a duct that ends above the floor and is supplied by means of a pump or an additional pump with the sewage sludge or the additional sewage sludge can be provided, for example.

The mixture is preferably cleared out by means of a/the conveyor apparatus arranged, preferably movably, above the floor at a/the movable carrier. It is particularly advantageous for the mixture to be transported during clearing out into a depression that is provided in the floor, from which the mixture is transported out of the drying hall by an additional conveyor apparatus. These measures allow the method to be fully automated.

The drying hall is preferably ventilated by means of at least one ventilator. This allows drying to be more independent of weather-based air currents, and accelerates drying. Furthermore, drying of the sewage sludge according to step c) and/or of the mixture according to step f) can be supported by the generation of at least one air current that strikes the sewage sludge and/or the mixture. This can be implemented, for example, using ventilators disposed in the upper region of the drying hall, which generate an air current directed onto the sewage sludge or the mixture.

Drying of the sewage sludge according to step c) and/or of the mixture according to step f) can further be supported by an additional heating of the sewage sludge or of the mixture, particularly by waste heat. Said waste heat, for example, can be provided from a combined heat and power plant from sewage sludge incineration, from sewage sludge gasification, from a heat pump, or from some other process, particularly biotechnological or chemical, which produces heat. The additional use of waste heat allows the drying performance to be further increased on a specific surface.

It is particularly preferable for the entire process to be automated, remotely monitored and/or remotely controlled.

The community operating the system therefore does not need to provide qualified employees for operating the system and can thereby further save on costs.

The sewage sludge and the additional sewage sludge are preferably provided by a sewage treatment plant and are introduced into the process from there, without intermediate storage, directly into step a) and/or d).

The invention further relates to a device for carrying out the method according to the invention, wherein the device comprises the following components:
- A unit for mechanically dehydrating the sewage sludge and the additional sewage sludge,
- A greenhouse-like drying hall having a floor, which is roofed by a transparent building shell,
- A pump for applying the dehydrated sewage sludge onto the floor and/or for introducing the dehydrated additional sewage sludge into the drying hall,
- A conveyor apparatus and
- A turning device.

The floor can be surrounded by a boundary which cannot be penetrated by the sewage sludge, the additional sewage sludge and the mixture as the process according to the invention is being carried out, except when the mixture is being cleared out of the drying hall. For clearing the mixture out, a sealable opening, for example, in the form of a sealable sheet-pile wall, can be provided in the boundary. The boundary can be a wall, for example. The boundary enables a higher layering of the sewage sludge, the additional sewage sludge and the mixture on the floor.

In what follows, the invention will be specified in greater detail in reference to an embodiment example and a drawing.

FIG. 1 shows a graphic representation of the average sewage sludge level in a greenhouse-like drying hall as the process according to the invention is carried out over a period of 12 months.

A sewage treatment plant operating in a community in southern Germany having a population of approximately 5,000 produces approximately 3,000 tons of sewage sludge annually, with a dry mass content of approximately 3%. This quantity corresponds to a volume of 8.2 m³ per clay, or 0.35 m³/hour.

A device according to the invention has a floor measuring 750 m² and formed from a water-tight floor plate made of concrete. The floor is surrounded by a boundary in the form of a concrete wall, approximately 1 m in height, which is equipped with an access opening that is closed during drying by a mobile sheet-pile wall. The floor is roofed by a greenhouse-like drying hall, comprising a transparent building shell made predominantly of glass, which has ventilation valves to allow air exchange with the surrounding environment.

Beginning in October, from Monday to Saturday, 0.35 m³/hour of the sewage sludge produced by the sewage treatment plant is continuously pumped to a unit for mechanically dehydrating the sewage sludge, where it is dehydrated to a dry mass content of approximately 15%. This results in approximately 0.07 tons of dehydrated sewage sludge and approximately 0.28 tons of filtrate per hour. The filtrate is pumped back into the sewage treatment plant. With the largely continuous dehydration of the sewage sludge, the intermittent production of large quantities of filtrate is avoided.

The dehydrated sewage sludge is pumped directly through three ducts, each of which ends in an opening in the floor, from the bottom into the device according to the invention. In this part of the process, an automatic valve regulates which of the three ducts and therefore also which of the openings the sewage sludge will be conducted through onto the floor of the device. In the device, air is blown onto the sewage sludge from above. For this purpose, a ventilator is arranged above each of the openings.

A self-propelled turning device, distributed by the applicant under the name "electric pig", travels around on the floor between 5 and 12 hours per day. It automatically distributes the sewage sludge, which forms cones in the area around the openings, onto the floor. The cones are thereby broken down, and additional sewage sludge exiting through the openings is mixed with sewage sludge that is already present on the floor and is at least partially dried. Mixing occurs in part because when the sewage sludge is very moist, it is tacky, and therefore clings to turning tools that are a part of the electric pig. It is therefore carried along to other areas, where it is mixed with the at least partially dried sewage sludge. The electric pig produces a sewage sludge level that is approximately equal in height throughout the entire apparatus, except in the area of the openings.

The removal of water that occurs as the sewage sludge is drying results in a reduction in its volume. During the winter, the level of sewage sludge in the device increases, because the decrease in volume resulting from water evaporation is lower than the increase in volume resulting from the introduction of additional sewage sludge. During the summer, these conditions are reversed. The maximum sewage sludge level is reached in the spring. It can be up to 25 cm.

FIG. 1 shows a graphic representation of the average sewage sludge levels in the drying hall as the process according to the invention is being carried out. The months, designated as numbers, are plotted on the X-axis, and the average sewage sludge levels, measured in cm, are plotted on the Y-axis. The arrow points to the day of removal of the dried sewage sludge from the drying hall.

From the 14$^{th}$ to the 30$^{th}$ of September, no additional sewage sludge is introduced into the drying hall. During this time all of the sewage sludge present in the drying hall dries to a dry mass content of approximately 90%. After drying, approximately 100 tons of sewage sludge is left.

On 1 October, the mobile sheet-pile wall is removed and the dried sewage sludge is cleared out of the drying hall using a wheel loader. On 2 October, the process begins again with the application of dehydrated sewage sludge onto the floor.

Throughout the entire process, the automatic valve, the ventilators, the self-propelled turning device and the positioning of the ventilation valves are controlled by a programmable logic controller.

The invention claimed is:

1. A method for the simultaneous storage and drying of sewage sludge comprising the following steps:
   a) Mechanically dehydrating the sewage sludge to a dry mass content of 10% to 35%,
   b) Applying the dehydrated sewage sludge by means of at least one pump to the floor of a greenhouse-like drying hall, the floor of which is roofed by a transparent building shell,
   c) Drying the sewage sludge utilizing solar radiation that radiates into the drying hall,
   d) Mechanically dehydrating additional sewage sludge to a dry mass content of 10% to 35%,
   e) Introducing the dehydrated additional sewage sludge by means of the at least one pump or at least one additional pump into the drying hall and mixing the additional sewage sludge with the sewage sludge that is already present in the drying hall,
   f) Drying the resulting mixture utilizing solar radiation that radiates into the drying hall, and g) Clearing the mixture out of the drying hall or repeating steps d) to f), wherein in step e) the additional sewage sludge is mixed with the mixture that is already present in the drying hall, rather than with the sewage sludge that is already present in the drying hall, wherein the mechanical dehydration is carried out largely continuously.

2. The method according to claim 1, wherein the sewage sludge and/or the additional sewage sludge is distributed after and/or during step b) and/or step e) onto the floor or onto the present sewage sludge or the present mixture, particularly by means of a conveyor apparatus that is arranged, preferably movably, above the floor at a movable carrier.

3. The method according to claim 1, wherein the sewage sludge and the mixture are turned and thereby aerated during steps c) and f), preferably depending on weather conditions and/or the moisture content of the sewage sludge or the mixture, and particularly by means of a self-propelled turning device or by means of a conveyor apparatus arranged, preferably movably, above the floor at a/the movable carrier.

4. The method according to claim 1, wherein the mixing according to step e) and/or g) is carried out by means of a self-propelled turning device or by means of a conveyor apparatus arranged, preferably movably, above the floor at a movable carrier.

5. The method according to claim 1, wherein in step g), steps d) to f) are repeated at least 5 times, especially at least 10 times, preferably at least 20 times, particularly preferably at least 40 times, before the mixture is cleared out of the drying hall.

6. The method according to claim 1, wherein before the mixture is cleared out according to step g), it is dried in step f) until it reaches a dry mass content of at least 70%, particularly at least 85%, preferably at least 90%.

7. The method according to claim 1, wherein the mixture is cleared out only once per year.

8. The method according to claim 1, wherein the application of the sewage sludge according to step b) and the introduction of the additional sewage sludge according to step e) is carried out through at least one opening that is present in the floor.

9. The method according to claim 1, wherein the clearing out is carried out by means of a conveyor apparatus arranged, preferably movably, above the floor at a movable carrier.

10. The method according to claim 1, wherein as the mixture is being cleared out, it is transported to a depression that is provided in the floor, from which the mixture is transported out of the drying hall by an additional conveyor apparatus.

11. The method according to claim 1, wherein the drying hall is ventilated by means of at least one ventilator.

12. The method according to claim 1, wherein the drying of the sewage sludge according to step c) and/or of the mixture according to step f) is supported by the generation of at least one air current that strikes the sewage sludge and/or the mixture.

13. The method according to claim 1, wherein the drying of the sewage sludge according to step c) and/or of the mixture according to step f) is supported by an additional heating of the sewage sludge or of the mixture, particularly by waste heat.

14. The method according to claim 1, wherein the entire process is automated, remotely monitored and/or remotely controlled.

15. The method according to claim 1, wherein the sewage sludge and the additional sewage sludge are provided by a sewage treatment plant and are introduced into the process from there, without intermediate storage, directly into step a) and/or d).

16. A device for carrying out a method according to claim 1, wherein the device comprises the following components:
   A unit for mechanically dehydrating the sewage sludge and the additional sewage sludge,
   A greenhouse-like drying hall having a floor, which is roofed by a transparent building shell,
   A pump for applying the dehydrated sewage sludge onto the floor and/or for introducing the dehydrated additional sewage sludge into the drying hall,
   A conveyor apparatus and
   A turning device.

17. The method according to claim 2, wherein the sewage sludge and the mixture are turned and thereby aerated during steps c) and f), preferably depending on weather conditions and/or the moisture content of the sewage sludge or the mixture, and particularly by means of a self-propelled turning device or by means of a/the conveyor apparatus arranged, preferably movably, above the floor at a/the movable carrier.

* * * * *